(12) United States Patent
Vu (10) Patent No.: US 10,680,927 B2
(45) Date of Patent: Jun. 9, 2020

(54) ADAPTIVE BEAM ASSESSMENT TO PREDICT AVAILABLE LINK BANDWIDTH

(71) Applicant: Advanced Micro Devices, Inc., Sunnyvale, CA (US)

(72) Inventor: Ngoc Vinh Vu, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 20 days.

(21) Appl. No.: 15/686,934

(22) Filed: Aug. 25, 2017

(65) Prior Publication Data

US 2019/0068473 A1 Feb. 28, 2019

(51) Int. Cl.
| | |
|---|---|
| *H04W 4/00* | (2018.01) |
| *H04L 12/26* | (2006.01) |
| *H04L 12/24* | (2006.01) |
| *H04W 28/02* | (2009.01) |
| *H04L 12/811* | (2013.01) |

(52) U.S. Cl.
CPC ...... *H04L 43/0882* (2013.01); *H04L 41/0896* (2013.01); *H04L 41/147* (2013.01); *H04L 41/16* (2013.01); *H04L 43/0894* (2013.01); *H04L 43/16* (2013.01); *H04L 47/38* (2013.01); *H04W 28/0231* (2013.01)

(58) Field of Classification Search
CPC ... H04L 43/0882; H04L 43/16; H04L 41/147; H04L 41/0896
See application file for complete search history.

(56) References Cited

U.S. PATENT DOCUMENTS

| | | | |
|---|---|---|---|
| 5,335,010 | A | 8/1994 | Lindemeier et al. |
| 5,818,543 | A | 10/1998 | Lee |
| 5,860,056 | A | 1/1999 | Pond |
| 6,414,960 | B1 | 7/2002 | Kuhn et al. |
| 7,479,981 | B2 | 1/2009 | Tierney et al. |
| 7,596,359 | B2 | 9/2009 | Kimoto et al. |
| 7,715,634 | B2 | 5/2010 | Lei et al. |
| 7,881,258 | B2 | 2/2011 | Gilbert et al. |

(Continued)

FOREIGN PATENT DOCUMENTS

| | | |
|---|---|---|
| WO | 2009156366 A1 | 12/2009 |
| WO | 2011087905 A1 | 7/2011 |

OTHER PUBLICATIONS

Final Office Action in U.S. Appl. No. 15/686,927, dated Feb. 27, 2018, 15 pages.

(Continued)

*Primary Examiner* — Clemence S Han
(74) *Attorney, Agent, or Firm* — Kowert Hood Munyon Rankin and Goetzel PC; Rory D. Rankin (57) ABSTRACT

Systems, apparatuses, and methods for dynamically adjusting data bandwidth to fit a predicted available bandwidth of a link are disclosed. A system includes a transmitter and a receiver communicating wirelessly over a wireless link. The system monitors a status of the wireless link at a plurality of points in time. The system trains a predictive model using a plurality of indicators of the status of the link at the plurality of points in time. The model generates a prediction of the available bandwidth of the link based on the plurality of indicators. Then, the transmitter dynamically adjusts an amount of data sent on the link to fit the predicted available bandwidth of the link.

20 Claims, 7 Drawing Sheets

(56) References Cited

U.S. PATENT DOCUMENTS

| | | |
|---|---|---|
| 8,300,563 B2 | 10/2012 | Krishnaswamy et al. |
| 8,365,238 B2 | 1/2013 | Reznic et al. |
| 8,422,961 B2 | 4/2013 | Kafle |
| 8,457,026 B1 | 6/2013 | Ho et al. |
| 9,450,620 B1 | 9/2016 | Ahmed et al. |
| 9,716,537 B2 | 7/2017 | Mammoser et al. |
| 9,786,985 B2 | 10/2017 | Kim et al. |
| 9,799,954 B2 | 10/2017 | Preradovic et al. |
| 9,948,413 B1 | 4/2018 | Zhou et al. |
| 10,312,980 B2 | 6/2019 | Maamari et al. |
| 2003/0072376 A1 | 4/2003 | Krishnamachari et al. |
| 2004/0081238 A1 | 4/2004 | Parhy |
| 2004/0196919 A1 | 10/2004 | Mehta et al. |
| 2004/0204103 A1 | 10/2004 | Rouphael |
| 2005/0185097 A1 | 8/2005 | Takatori et al. |
| 2006/0017843 A1 | 1/2006 | Shi et al. |
| 2006/0209890 A1 | 9/2006 | MacMullan et al. |
| 2006/0209892 A1 | 9/2006 | MacMullan et al. |
| 2006/0212911 A1 | 9/2006 | MacMullan et al. |
| 2007/0223380 A1 | 9/2007 | Gilbert et al. |
| 2008/0064425 A1 | 3/2008 | Kim et al. |
| 2008/0088635 A1 | 4/2008 | Callway et al. |
| 2008/0144713 A1 | 6/2008 | Kimmich et al. |
| 2009/0150943 A1 | 6/2009 | Vasudevan et al. |
| 2009/0213940 A1 | 8/2009 | Steinbach et al. |
| 2010/0009635 A1 | 1/2010 | Qin et al. |
| 2010/0150252 A1 | 6/2010 | Camp, Jr. et al. |
| 2010/0214169 A1 | 8/2010 | Kafle |
| 2011/0058104 A1 | 3/2011 | Arai |
| 2011/0070928 A1 | 3/2011 | Hsu et al. |
| 2011/0151790 A1 | 6/2011 | Khandekar et al. |
| 2011/0286545 A1* | 11/2011 | Guignard ......... H04N 21/23406 375/295 |
| 2012/0276896 A1 | 11/2012 | Ren et al. |
| 2012/0327115 A1 | 12/2012 | Chhetri et al. |
| 2013/0115887 A1 | 5/2013 | Kwon et al. |
| 2013/0242117 A1 | 9/2013 | Luo et al. |
| 2014/0010319 A1 | 1/2014 | Baik et al. |
| 2014/0126620 A1 | 5/2014 | Maltsev et al. |
| 2014/0266900 A1 | 9/2014 | Kasher |
| 2014/0269937 A1 | 9/2014 | Wadsworth et al. |
| 2014/0368667 A1 | 12/2014 | Peterson et al. |
| 2015/0110167 A1 | 4/2015 | Chen et al. |
| 2015/0289147 A1 | 10/2015 | Lou et al. |
| 2015/0333994 A1* | 11/2015 | Gell .................... H04L 43/0882 709/224 |
| 2015/0341646 A1* | 11/2015 | Sze ...................... H04N 19/166 375/240.26 |
| 2016/0105229 A1 | 4/2016 | Trainin et al. |
| 2016/0134485 A1* | 5/2016 | Thapliya ............. H04L 43/0894 370/252 |
| 2016/0149633 A1 | 5/2016 | Sanderovich et al. |
| 2016/0227432 A1* | 8/2016 | Freeman ........... H04W 28/0289 |
| 2016/0301770 A1* | 10/2016 | Marra ................... H04L 67/327 |
| 2016/0337150 A1 | 11/2016 | Larsson et al. |
| 2017/0026263 A1* | 1/2017 | Gell .................... G06F 16/1844 |
| 2017/0127408 A1* | 5/2017 | Du ...................... H04B 17/318 |
| 2017/0134076 A1 | 5/2017 | Maamari et al. |
| 2017/0141885 A1 | 5/2017 | Bontu et al. |
| 2017/0156067 A1 | 6/2017 | Huang |
| 2017/0207839 A1 | 7/2017 | Eitan et al. |
| 2017/0222704 A1 | 8/2017 | Eitan et al. |
| 2017/0251484 A1 | 8/2017 | Negus et al. |
| 2017/0264350 A1 | 9/2017 | Sanderovich et al. |
| 2018/0062719 A1 | 3/2018 | Verma et al. |
| 2018/0074188 A1 | 3/2018 | Polo et al. |
| 2018/0093177 A1 | 4/2018 | Tokubo |
| 2018/0123901 A1* | 5/2018 | Yermakov ............. H04L 41/145 |
| 2018/0137412 A1* | 5/2018 | Nikkhah .................. G06N 3/08 |
| 2018/0198506 A1 | 7/2018 | Sanderovich et al. |
| 2018/0199256 A1* | 7/2018 | Sanderovich ........ H04B 7/0695 |
| 2018/0205423 A1 | 7/2018 | Sanderovich et al. |
| 2018/0227027 A1 | 8/2018 | Trainin et al. |
| 2018/0234860 A1 | 8/2018 | Kasher et al. |
| 2018/0248603 A1 | 8/2018 | Kasher et al. |
| 2018/0288635 A1* | 10/2018 | Kaushik .................. H04W 4/00 |
| 2019/0036572 A1 | 1/2019 | Kasher et al. |
| 2019/0068926 A1 | 2/2019 | Vu et al. |
| 2019/0101638 A1 | 4/2019 | Vu et al. |
| 2019/0104276 A1 | 4/2019 | Vu et al. |
| 2019/0104458 A1* | 4/2019 | Svennebring ......... H04W 36/30 |
| 2019/0158156 A1 | 5/2019 | Da Silva et al. |
| 2019/0173544 A1 | 6/2019 | Vu et al. |
| 2019/0199467 A1 | 6/2019 | Vu |
| 2019/0215256 A1* | 7/2019 | Dhanabalan ............. G06N 5/04 |
| 2019/0230185 A1* | 7/2019 | Dhanabalan ........ H04L 12/1407 |
| 2019/0261209 A1* | 8/2019 | Balasubramanian ... H04L 47/26 |

OTHER PUBLICATIONS

Non-Final Office Action in U.S. Appl. No. 15/686,927, dated Nov. 1, 2017, 16 pages.
Non-Final Office Action in U.S. Appl. No. 15/686,927, dated Aug. 8, 2018, 19 pages.
Final Office Action in U.S. Appl. No. 15/686,927, dated Jan. 17, 2019, 17 pages.
International Search Report and Written Opinion in International Application No. PCT/US2018/052350, dated Dec. 14, 2018, 13 pages.
Jan Der Schaar et al., "Robust Transmission of MPEG-4 Scalable Video Over 4G Wireless Networks", International Conference on Image Processing, Sep. 22, 2002, pp. 757-760, vol. 3, IEEE.
International Search Report and Written Opinion in International Application No. PCT/US2018/052373, dated Jan. 7, 2019, 13 pages.
Vu, Ngoc Vinh, U.S. Appl. No. 15/852,833, entitled "Video Codec Data Recovery Techniques for Lossy Wireless Links", tiled Dec. 22, 2017, 36 pages.
Non-Final Office Action in U.S. Appl. No. 15/686,927, dated Jun. 11, 2019, 12 pages.
Non-Final Office Action in U.S. Appl. No. 15/721,125, dated Feb. 20, 2019, 9 pages.
Non-Final Office Action in U.S. Appl. No. 15/852,833, dated May 31, 2019, 11 pages.
Non-Final Office Action in U.S. Appl. No. 15/832,448, dated Feb. 1, 2019, 15 pages.
Final Office Action in U.S. Appl. No. 15/721,125, dated Sep. 10, 2019, 9 pages.
Final Office Action in U.S. Appl. No. 15/832,448, dated Sep. 30, 2019, 18 pages.
Final Office Action in U.S. Appl. No. 15/686,927, dated Oct. 2, 2019, 7 pages.
Final Office Action in U.S. Appl. No. 15/852,833, dated Oct. 3, 2019, 12 pages.
Non-Final Office Action in U.S. Appl. No. 15/686,927, dated Jan. 7, 2020, 10 pages.
Non-Final Office Action in U.S. Appl. No. 15/721,125, dated Jan. 7, 2020, 10 pages.

* cited by examiner

ADAPTIVE BEAM ASSESSMENT TO PREDICT AVAILABLE LINK BANDWIDTH

BACKGROUND

Description of the Related Art

A wireless communication link can be used to send a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application which does not typically buffer video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for adaptive beam assessment to predict the available bandwidth of a wireless link are disclosed herein. In one embodiment, a wireless communication system includes a transmitter and a receiver communicating over a wireless link. In one embodiment, the transmitter is configured to encode a video stream and wirelessly transmit the encoded video stream to the receiver. In one embodiment, the video stream is part of a virtual reality (VR) rendered environment.

In one embodiment, the system is configured to monitor the status of the wireless link between the transmitter and receiver over time. The system monitors the status of the link over time and provides indicators of the status as inputs to a model. The system trains the model to predict the status of the link. Next, the trained model calculates a predicted available bandwidth of the link. Then, the system dynamically adjusts an amount of data sent on the link to fit the predicted available bandwidth of the link. For example, if the predicted available bandwidth of the link is below a threshold, then the system increases a compression rate of data being sent on the link. In some cases, the system can be proactive in increasing the compression of the data so as to avoid losing data on the link. If the system waits until after data is lost on the link to increase compression, this can result in unacceptable performance for the end-user application. Alternatively, if the predicted available bandwidth of the link is above the threshold, the system can decrease a compression rate of data being sent on the link.

In one embodiment, the system generates a plurality of values associated with the quality of the link. The plurality of values can include parameters generated during beam-forming training between the transmitter and the receiver, a calculated signal to noise ratio (SNR) of signals received on the link, and/or other values. Next, the system applies a separate weighting to each value of the plurality of values. Then, the system adds together the plurality of values multiplied by corresponding weights to generate a score indicative of the quality of the link. The system records the score at multiple points in time and provides the scores to a machine learning model. In one embodiment, the model analyzes the scores to detect any patterns in the history of scores. Then, the model predicts a future score of the link quality based on any detected patterns.

Figure 1:
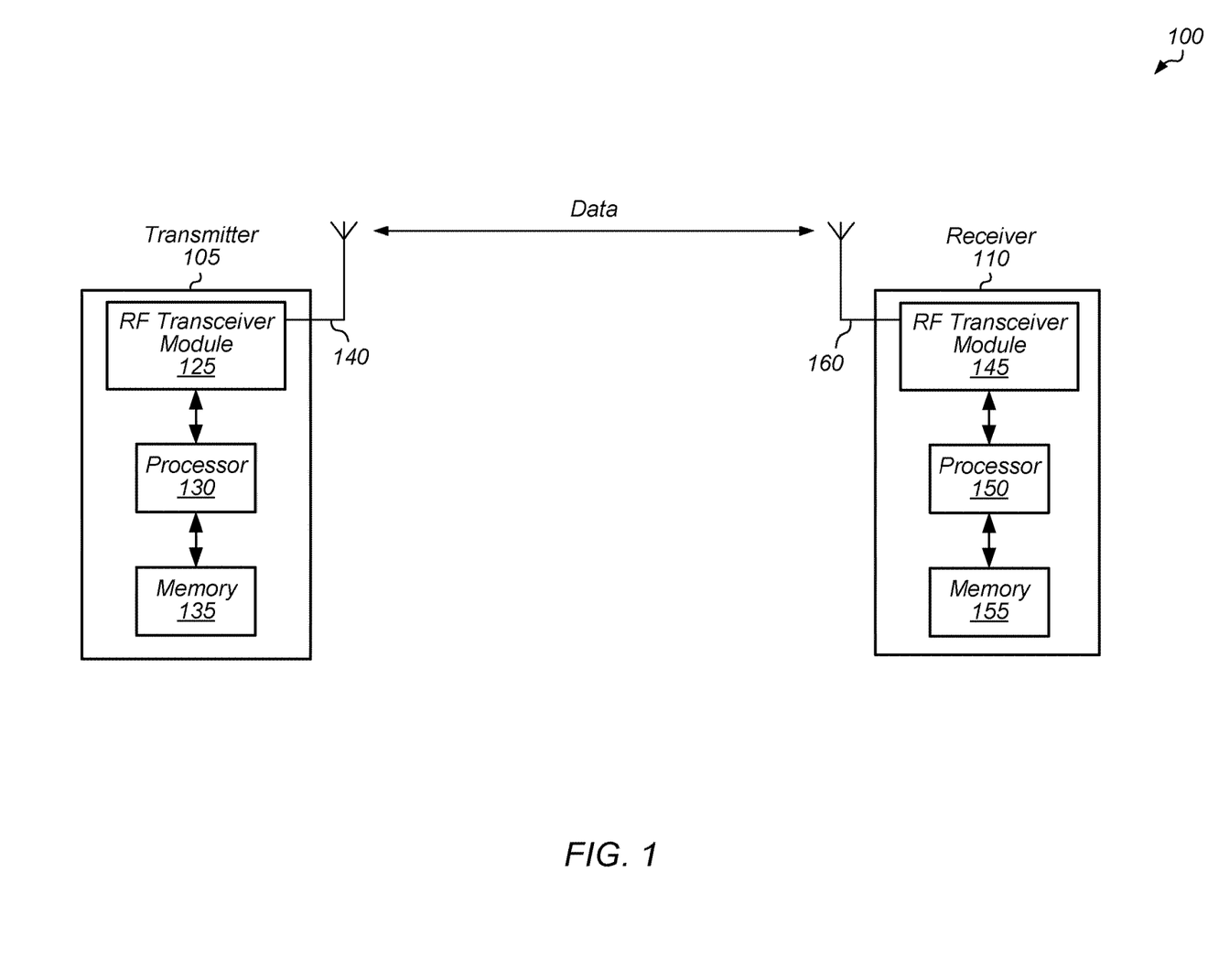
FIG. 1 is a block diagram of one embodiment of a system.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that receiver 110 can also transmit data and/or acknowledgments to transmitter 105. Accordingly, transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the optimal transmit and/or receive antenna combinations for wireless data transmission.

In one embodiment, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure.

Transmitter 105 and receiver 110 are representative of any type of communication devices and/or computing devices. For example, in various embodiments, transmitter 105 and/or receiver 110 can be a mobile phone, tablet, computer, server, head-mounted display (HMD), television, another type of display, router, or other types of computing or communication devices. In various embodiments, system 100 is configured to execute latency sensitive applications. For example, in one embodiment, system 100 executes a virtual reality (VR) application for wirelessly transmitting frames of a rendered virtual environment from transmitter 105 to receiver 110. In other embodiments, other types of latency sensitive applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are similar to the components described above for transmitter 105. It should be understood that receiver 110 can also include or be coupled to other components (e.g., a display).

In one embodiment, transmitter 105 is configured to send data packets using a selected transmit sector to receiver 110 which receives the data packets on a selected receive sector. In various embodiments, the link between transmitter 105 and receiver 110 has capacity characteristics that fluctuate with variations in the environment. Transmitter 105 can attempt to prevent losing data packets which are sent over the link by predicting that the link will deteriorate prior to the loss or corruption of data sent over the link. When transmitter 105 predicts that the link will deteriorate, transmitter 105 proactively increases the compression rate of data being sent on the link. Accordingly, transmitter 105 avoids the loss of data packets by sending an amount of data which is slightly less than the actual capacity of the link. Transmitter 105 achieves this goal by dynamically adapting the compression rate of data being transmitted prior to any data being lost.

For example, in one embodiment, transmitter 105 and receiver 110 perform periodic beamforming training procedures to determine whether to adjust the beamforming characteristics of their respective antennas. During a beamforming training procedure, transmitter 105 and/or receiver 110 can generate a score which is a measure of the link quality. Transmitter 105 and/or receiver 110 can maintain a history of the scores which are generated to measure link quality, and patterns can be detected in the historical scores. Based on a detected pattern, transmitter 105 and/or receiver 110 can predict that the available bandwidth on the link will fall below a threshold. If a prediction is generated that the link quality will fall below a threshold, then during regular data transmission following the beamforming training procedure, the transmitter 105 reduces an amount of data sent on the link to fit the predicted available bandwidth. In certain latency sensitive applications, reducing the amount of data sent on the link proactively can result in improved performance of the applications.

Figure 2:
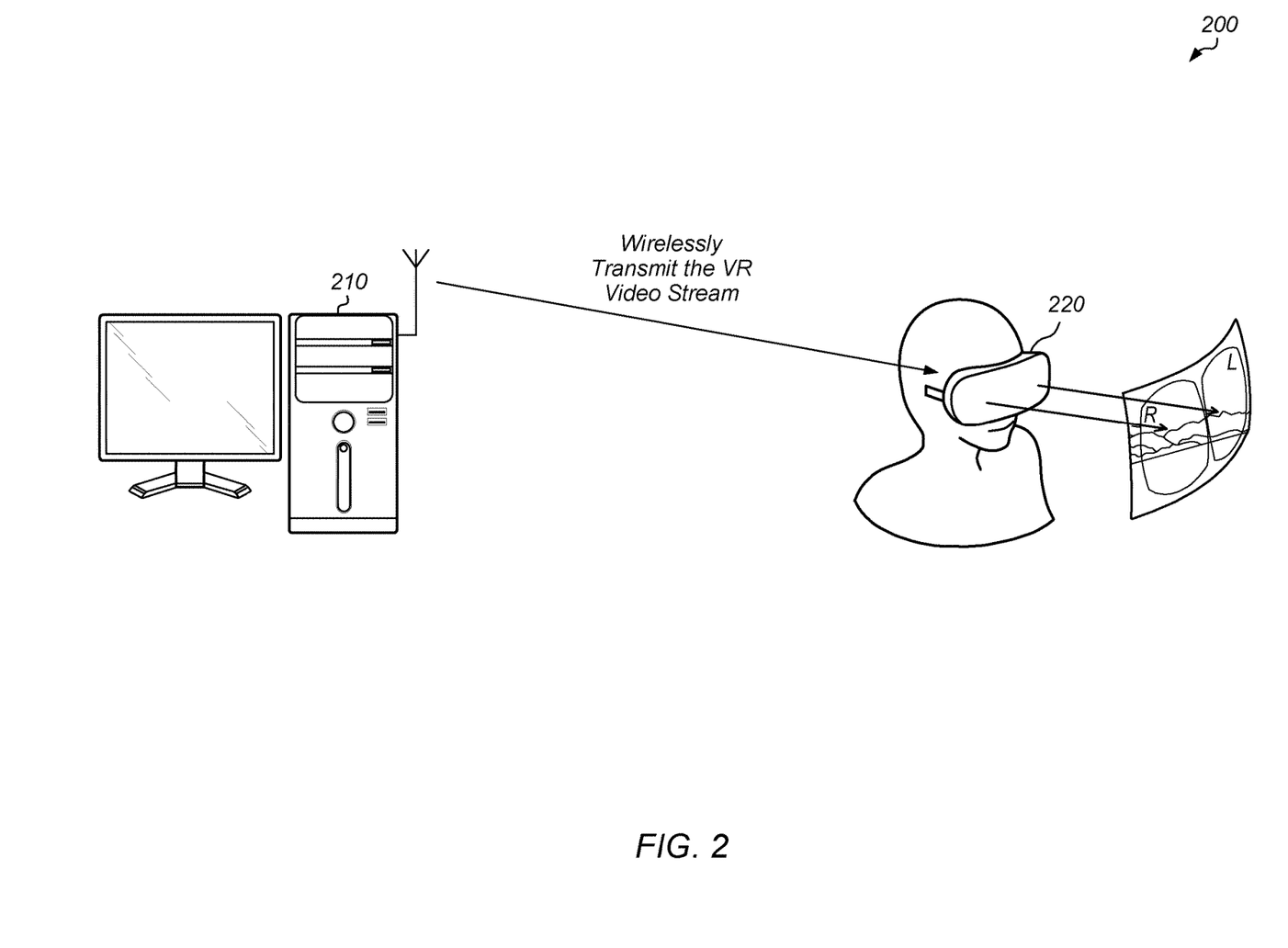
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 may be a gaming console, smart phone, set top box, television set, video streaming device, wearable device, a component of a theme park amusement ride, or otherwise.

Computer 210 and HMD 220 each include circuitry and/or components to communicate wirelessly. It should be understood that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

After rendering a frame of a virtual environment video stream, computer 210 encodes (i.e., compresses) the rendered frame and then sends the encoded frame wirelessly to HMD 220. In one embodiment, computer 210 determines how much to compress each rendered frame based on a prediction of the available bandwidth on the wireless link. For example, in one embodiment, computer 210 predicts how much bandwidth is available on the link based on information obtained during a beamforming training procedure. Computer 210 and HMD 220 perform beamforming training procedures periodically to update which sectors should be utilized for transmitting and receiving wireless signals. For example, as the position of HMD 220 changes with respect to computer 210, the antenna sectors which will optimize the transmission of RF signals can change. Additionally, other factors can affect the quality of the link between computer 210 and HMD 220, such as the proximity of walls or other objects to each device, the presence of any obstacles directly in between the devices, and/or other factors. When computer 210 and HMD 220 perform a beamforming training procedure, each device can take measurements of the quality of the link at that time.

In one embodiment, computer 210 and HMD 220 maintain a history of scores generated for the link quality, with these scores generated during multiple beamforming training procedures. Computer 210 analyzes the history of scores to determine if any patterns are detected. Then, computer 210 predicts the available bandwidth of the link based on any detected patterns in the history of scores. After predicting the available bandwidth of the link, computer 210 adjusts how much each video frame is compressed so that the compressed video frame fits in the available bandwidth of the link.

Figure 3:
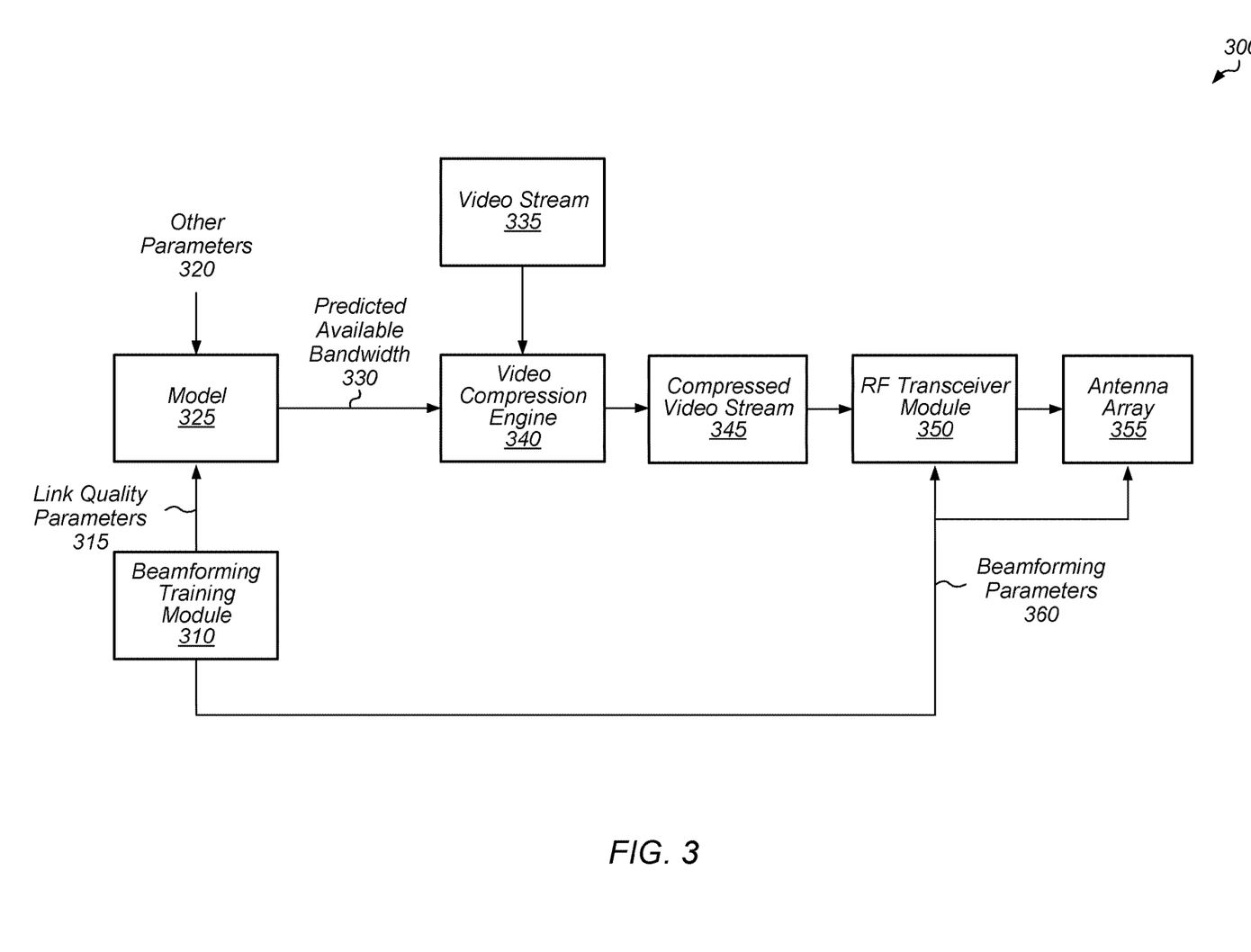
FIG. 3 is a block diagram of one embodiment of a transceiver.

Referring now to FIG. 3, a block diagram of one embodiment of logic of a transceiver 300 is shown. In one embodiment, transceiver 300 includes at least beamforming training module 310, model 325, video compression engine 340, RF transceiver module 350, and antenna array 355. In one embodiment, transmitter 105 and/or receiver 110 (of FIG. 1) include the components of transceiver 300 shown in FIG. 3. In another embodiment, computer 210 and/or HMD 220 (of FIG. 2) include the components of transceiver 300. The components of transceiver 300 can be implemented using any suitable combination of hardware and/or software. Also, it should be noted that other components can be included in transceiver 300 in other embodiments, and/or that other configurations of components can be implemented in transceiver 300 in other embodiments. For example, two or more of the components shown in transceiver 300 can be combined together in another embodiment.

Beamforming training module 310 is configured to perform periodic beamforming training procedures to select the best transmit or receive sectors for antenna array 355. Beamforming training module 310 sends beamforming parameters 360 to antenna array 355 to configure RF transceiver module 350 and antenna array 355 to select the optimal sector for transmitting and/or receiving RF signals. Beamforming training module 310 also monitors the quality of the link during beamforming training and generates link quality parameters 315 based on the quality of the link. Inputs to beamforming training module 310 can come from its own receiver module as well as other remote receiver devices (e.g., HMD). Beamforming training module 310 provides link quality parameters 315 to model 325 for use in generating the predicted available bandwidth 330.

Model 325 also receives other parameters 320 which can be based on other factors such as the SNR detected during previous regular data transmissions, the amount of data lost during previous regular data transmissions, and/or other factors. The term "regular data transmission" is defined as application data sent during execution of a given application. The term "regular data transmission" is meant to differentiate "regular data" from the data which is sent during beamforming training.

In one embodiment, model 325 is trained using link quality parameters 315 and other parameters 320. In one embodiment, model 325 utilizes link quality parameters 315 and other parameters 320 which are captured over a plurality of points in time to determine the status of the wireless link. Then, model 325 calculates a predicted available bandwidth 330 of the link based on the link quality parameters 315 and other parameters 320 at the plurality of points in time. Next, video compression engine 340 dynamically adjusts a compression rate used to compress video stream 335 into compressed video stream 345. Compressed video stream 345 is then sent over the link by RF transceiver module 350 and antenna array 355.

In one embodiment, model 325 generates a score for the link quality based on the plurality of inputs. Model 325 maintains a history of the score of the link quality. Model 325 detects patterns in the history of the score measuring the link quality, and model 325 generates a prediction of a future link quality score based on any detected patterns. For example, if model 325 detects that a score of link quality has been decreasing for several consecutive intervals, model 325 can predict that the score will continue to decrease for subsequent intervals. Accordingly, model 325 can generate a substantially reduced predicted available bandwidth to indicate that model 325 is predicting that the link will continue to deteriorate. Then, video compression engine 340 will increase the compression rate in response to receiving the substantially reduced predicted available bandwidth.

For example, prior to transceiver 300 detecting lost data on the link, video compression engine 340 can increase the compression rate proactively based on a prediction generated by model 325. For certain video streaming applications, it is preferable to reduce the video quality by increasing the compression rate rather than losing video data based on a deteriorating link. Accordingly, model 325 can be proactive and predict a deteriorating link in advance which can help prevent video data from being lost. Lost video data can result in glitches and an unacceptable viewing experience by the user.

Figure 4:
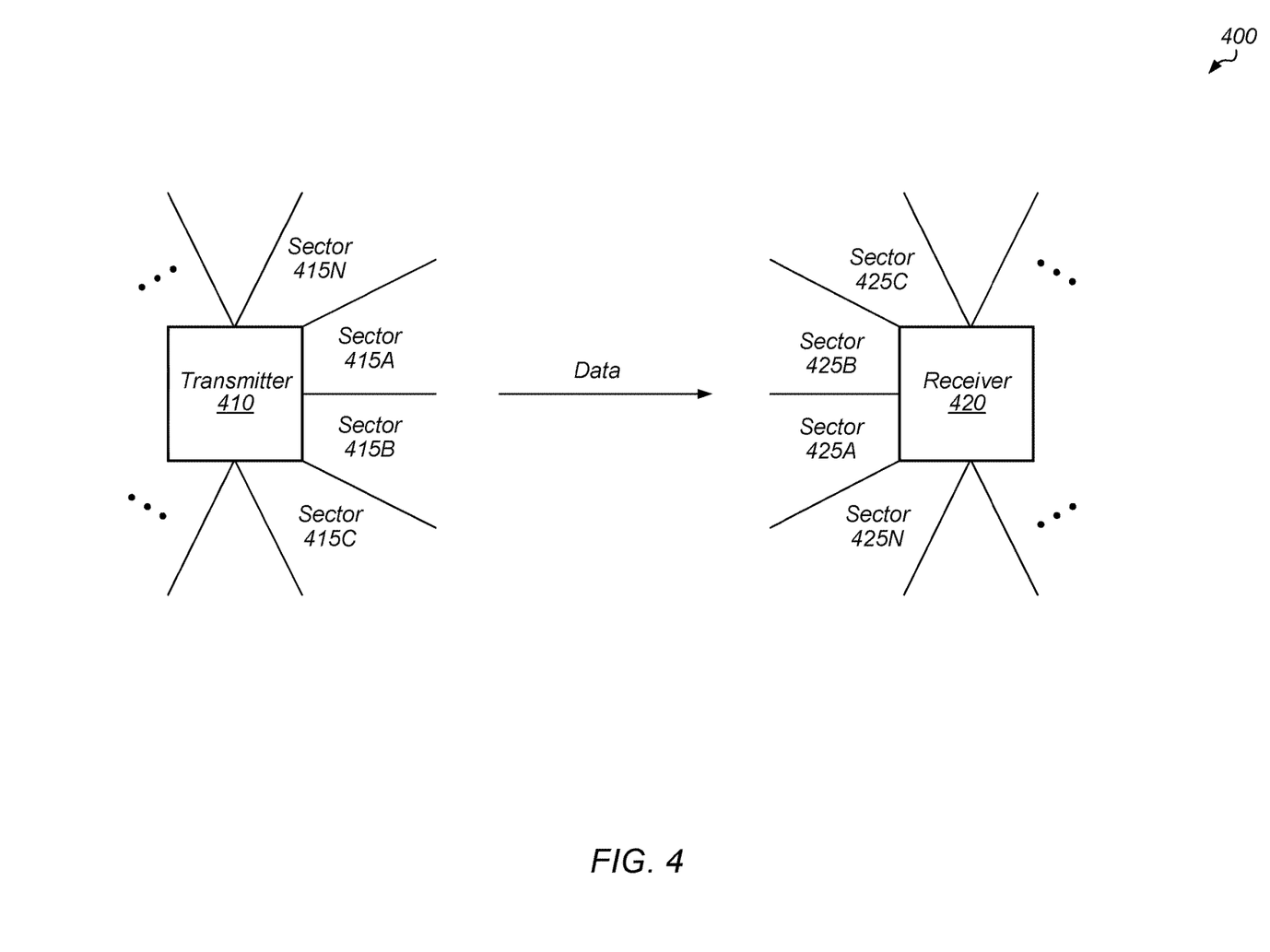
FIG. 4 is a diagram of one embodiment of transmit and receive beamforming sectors.

Turning now to FIG. 4, a diagram depicting transmit and receive beamforming sectors is shown. In system 400, transmitter 410 is configured to perform each of its directional transmissions towards a respective transmit sector selected from among a plurality of transmit sectors 415A-N. Transmit sectors 415A-N are representative of any number of transmit sectors, with the number varying from embodiment to embodiment. Receiver 420 is configured to perform each of its directional receptions from a respective receive sector selected from among a plurality of receive sectors 425A-N, which are representative of any number of receive sectors.

When communicating with receiver 420, transceiver 410 directionally transmits RF signals toward a selected one of transmit sectors 415A-N. If transceiver 410 transmits signals toward transmit sectors in a direction away from receiver 420, the energy levels of signals received by receiver 420 will be low, preventing receiver 420 from successfully receiving the signals. Otherwise, if transmitter 410 transmits signals to a transmit sector oriented toward receiver 420, signals will arrive at receiver 420 with high levels of energy. For example, if receiver 420 is monitoring receive sector 425A or 425B for incoming transmissions at the same time that a signal arrives from transmitter 410 with high levels of energy, receiver 420 will receive the signal with a high level of power, enabling receiver 420 to successfully extract the data from the signal.

During beamforming training, transmitter 410 and receiver 420 each cycle through the different sectors to determine the best configuration for transmitting data from transmitter 410 to receiver 420. If one or both of transmitter 410 and receiver 420 are mobile, then the best sectors for transmitting data can change over time. Accordingly, transmitter 410 and receiver 420 can repeat the beamforming training procedure at periodic intervals to determine if an alternate configuration would result in a better connection.

Transmitter 410 and receiver 420 are configured to reinitiate the beamforming training procedure periodically in order to determine whether link quality can be improved by using different beamforming parameters. In one embodiment, transmitter 410 and receiver 420 determine whether to initiate a beamforming training procedure by measuring a signal-to-noise ratio (SNR) of a received signal over beamformed links. If the SNR of the received signal is less than a threshold, then transmitter 410 and receiver 420 perform a beamforming training procedure. In other embodiments, transmitter 410 and receiver 420 initiate a beamforming training procedure on a fixed schedule regardless of the SNR of the received signal. If it is determined during a beamforming training procedure that the link quality has deteriorated, then transmitter 410 can adjust the amount of compression applied to the data sent in subsequent packets after the beamforming training procedure is finished. In one embodiment, transmitter 410 increases the amount of compression applied to data being transmitted before detecting that data has been lost during transmission. This proactive increase in the compression rate can be useful in scenarios where a loss of data would cause artifacts or other glitches in a user viewing experience.

Figure 5:
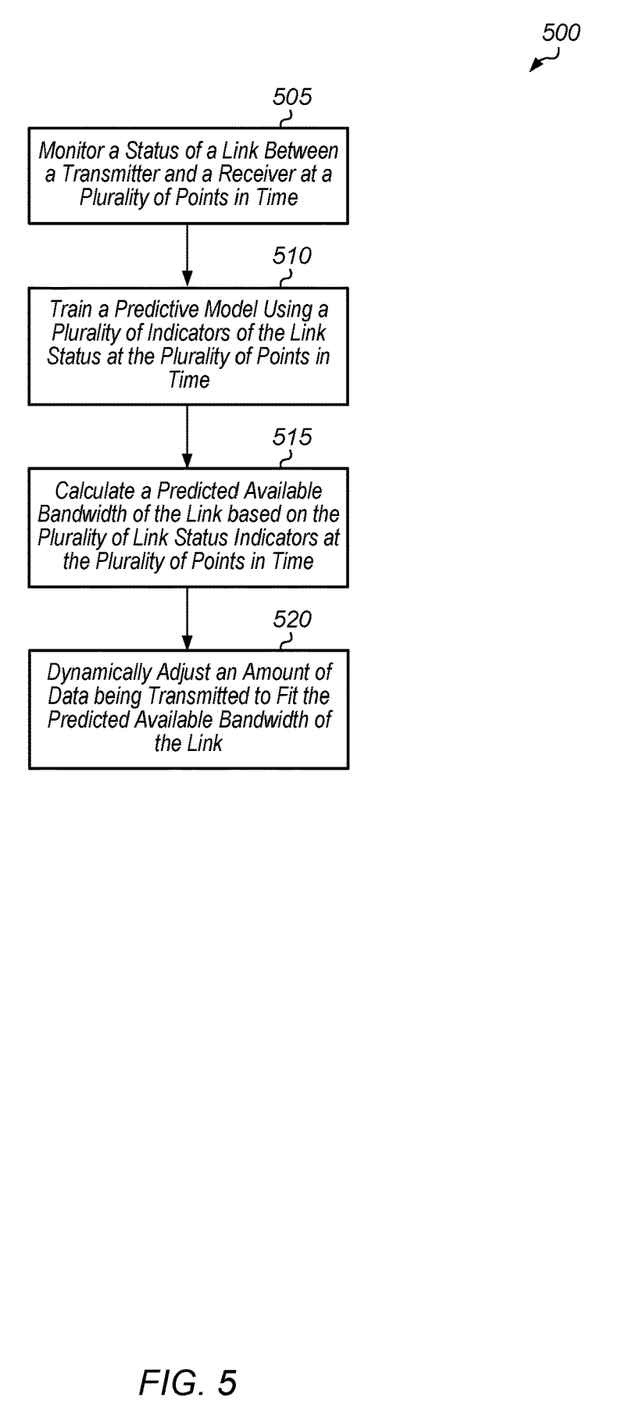
FIG. 5 is a generalized flow diagram illustrating one embodiment of a method for dynamically adjusting data to fit the available bandwidth of a wireless link.
Figure 6:
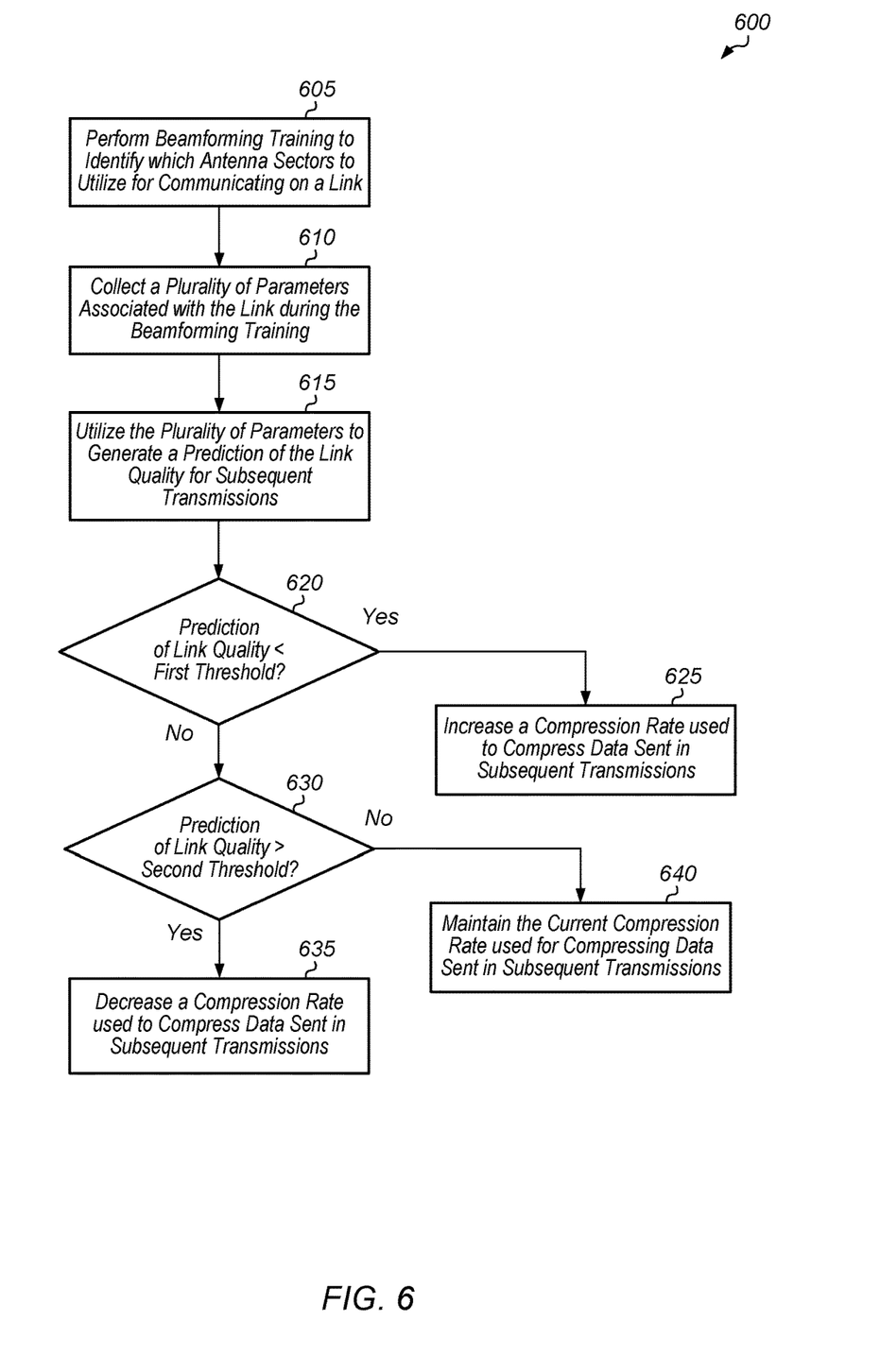
FIG. 6 is a generalized flow diagram illustrating another embodiment of a method for utilizing beamforming training information to predict link quality.
Figure 7:
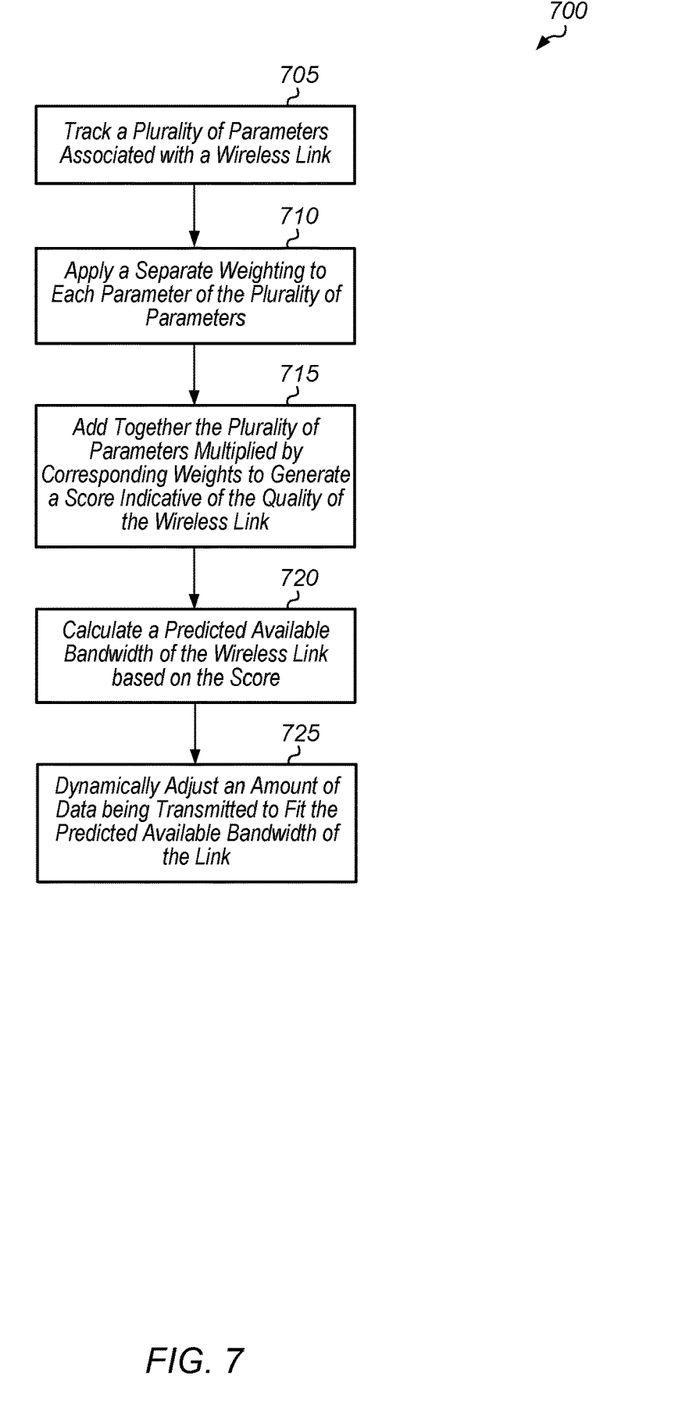
FIG. 7 is a generalized flow diagram illustrating one embodiment of a method for predicting an available bandwidth of a link.

Referring now to FIG. 5, one embodiment of a method 500 for dynamically adjusting data to fit the available bandwidth of a wireless link is shown. For purposes of discussion, the steps in this embodiment and those of FIG. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A system monitors a status of a link between a transmitter and a receiver at a plurality of points in time (block 505). For example, the system can monitor the status of the link during transmission of multiple regular data packets and during multiple beamforming training sessions. The transmitter and the receiver can be any types of computing devices, with the type of computing device varying according to the embodiment. In one embodiment, the transmitter is sending a rendered video stream to the receiver as part of a VR environment. In one embodiment, the transmitter is a computer and the receiver is a HMD. In other embodiments, the transmitter and/or the receiver can be other types of computing devices and/or other types of data can be sent from the transmitter to the receiver.

The system trains a predictive model using a plurality of indicators of the link status at the plurality of points in time (block 510). Next, the model calculates a predicted available bandwidth of the link based on the plurality of indicators of the link status at the plurality of points in time (block 515). In one embodiment, the model is a machine learning model which can be implemented using any suitable combination of hardware and/or software. Then, the transmitter dynamically adjusts an amount of data being transmitted to fit the predicted available bandwidth of the link (block 520). In one embodiment, the transmitter dynamically adjusts a compression rate used to compress frames of a video stream to fit the predicted available bandwidth of the link. After block 520, method 500 ends.

Turning now to FIG. 6, one embodiment of a method 600 for utilizing beamforming training information to predict link quality is shown. A transmitter and a receiver perform beamforming training to identify which antenna sectors to utilize for communicating on a link (block 605). During the beamforming training, the transmitter and receiver collect a plurality of parameters associated with the link (block 610). Then, the transmitter utilizes the plurality of parameters to generate a prediction of the link quality for subsequent transmissions (block 615). If the prediction of the link quality is less than a first threshold (conditional block 620, "yes" leg), then the transmitter increases a compression rate of the data for subsequent transmissions (block 625). If the prediction of the link quality is greater than or equal to the first threshold (conditional block 620, "no" leg), then the transmitter determines if the prediction of the link quality is greater than a second threshold (conditional block 630). It is noted that in various embodiments the first and second thresholds are adjustable. In one embodiment, the first and second thresholds are adaptively adjusted based on current and historical information.

If the prediction of the link quality is greater than the second threshold (conditional block 630, "yes" leg), then the transmitter decreases a compression rate of the data being transmitted on the link in subsequent transmissions (block 635). If the prediction of the link quality is less than or equal to the second threshold (conditional block 630, "no" leg), then the transmitter maintains the current compression rate of the data being transmitted on the link in subsequent transmissions (block 640). After blocks 625, 635, and 640, method 600 ends.

Referring now to FIG. 7, one embodiment of a method 700 for predicting an available bandwidth of a link is shown. A transmitter tracks a plurality of parameters associated with a wireless link (block 705). Various parameters being tracked include an amount of data lost on the link, a received signal strength indicator, a SNR of received signals, measurements taken during beamforming training, and/or other parameters. Next, the transmitter applies a separate weighting to each parameter of the plurality of parameters (block 710). Then, the transmitter adds together the plurality of parameters multiplied by corresponding weights to generate a score indicative of the quality of the wireless link (block 715).

Next, the transmitter calculates a predicted available bandwidth of the wireless link based on the score (block 720). For example, in one embodiment, the transmitter maintains a table to perform a translation of a score to a predicted available bandwidth of the link. Once the score is calculated, the transmitter performs a lookup of the table to find a corresponding predicted available bandwidth. In other embodiments, the transmitter can utilize other techniques for calculating a predicted available bandwidth of the wireless link based on the score. After calculating the predicted available bandwidth, the transmitter dynamically adjusts an amount of data being transmitted to fit the predicted available bandwidth (block 725). After block 725, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a transmitter; and
   wherein the system is configured to:
      monitor a link quality of a wireless link established at the transmitter;
      maintain a translation structure to perform a translation of a score to a predicted available bandwidth of the wireless link;
      generate a plurality of parameters associated with a link quality of the wireless link, wherein the plurality of parameters are at least based on one or more signal strength measurements taken during beamforming training;
      generate a given score based on the plurality of parameters;
      perform a lookup of the translation structure to find a predicted available bandwidth corresponding to the given score; and
      dynamically adjust an amount of data sent on the wireless link to fit the predicted available bandwidth of the wireless link.

2. The system as recited in claim 1, wherein to monitor the link quality the system is configured to:
   apply a separate weighting to each parameter of the plurality of parameters; and
   add together the plurality of parameters multiplied by corresponding weights to generate the given score indicative of the link quality.

3. The system as recited in claim 2, wherein the system is configured to:
   detect a pattern in a history of scores of the link quality;
   predict a score of future link quality based on the pattern; and
   increase a compression rate of data being sent on the wireless link responsive to predicting that the score of future link quality is below a threshold.

4. The system as recited in claim 1, wherein the system is configured to:
   increase a compression rate of data being sent on the wireless link if the predicted available bandwidth of the link is below a threshold; and
   decrease the compression rate of data being sent on the wireless link if the predicted available bandwidth of the wireless link is above the threshold.

5. The system as recited in claim 1, wherein the translation structure is a table.

6. The system as recited in claim 1, wherein the system is configured to:
   predict a decrease in link quality based on the given score; and
   increase a compression rate of data being transmitted responsive to predicting the decrease in link quality.

7. The system as recited in claim 6, wherein the system is configured to increase the compression rate of data being transmitted prior to detecting a loss of data sent on the wireless link.

8. A method comprising:
   monitoring link quality of a wireless link established at a transmitter;
   maintaining a translation structure to perform a translation of a score to a predicted available bandwidth of the wireless link;
   generating a plurality of parameters associated with a link quality of the wireless link, wherein the plurality of parameters are at least based on one or more signal strength measurements taken during beamforming training;
   generating a given score based on the plurality of parameters;
   performing a lookup of the translation structure to find a predicted available bandwidth corresponding to the given score;
   calculating a predicted available bandwidth for subsequent transmissions on the wireless link based on the plurality of parameters; and
   dynamically adjusting an amount of data sent on the wireless link to fit the predicted available bandwidth of the wireless link.

9. The method as recited in claim 8, wherein monitoring the link quality comprises:
   apply a separate weighting to each parameter of the plurality of parameters;
   add together the plurality of parameters multiplied by corresponding weights to generate the given score indicative of the link quality.

10. The method as recited in claim 9, further comprising:
detecting a pattern in a history of scores of the link quality;
predicting a future score of link quality based on the pattern; and
increasing a compression rate of data being sent on the wireless link responsive to predicting that the score of future link quality is below a threshold.

11. The method as recited in claim 8, further comprising:
increasing a compression rate of data being sent on the wireless link if the predicted available bandwidth of the wireless link is below a threshold; and
decreasing the compression rate of data being sent on the wireless link if the predicted available bandwidth of the wireless link is above the threshold.

12. The method as recited in claim 8, wherein the translation structure is a table.

13. The method as recited in claim 8, further comprising:
predicting a decrease in link quality based on the given score; and
increasing a compression rate of data being transmitted responsive to predicting the decrease in link quality.

14. The method as recited in claim 13, further comprising increasing the compression rate of data being transmitted prior to detecting a loss of data sent on the wireless link.

15. An apparatus comprising:
a processor; and
a memory;
wherein the apparatus is configured to:
monitor a link quality of a wireless link established at the transmitter;
maintain a translation structure to perform a translation of a score to a predicted available bandwidth of the wireless link;
generate a plurality of parameters associated with a link quality of the wireless link, wherein the plurality of parameters are at least based on one or more signal strength measurements taken during beamforming training;
generate a given score based on the plurality of parameters;
perform a lookup of the translation structure to find a predicted available bandwidth corresponding to the given score; and
dynamically adjust an amount of data sent on the wireless link to fit the predicted available bandwidth of the wireless link.

16. The apparatus as recited in claim 15, wherein monitoring the link quality comprises:
apply a separate weighting to each parameter of the plurality of parameters;
add together the plurality of parameters multiplied by corresponding weights to generate the given score indicative of the link quality.

17. The apparatus as recited in claim 16, wherein the apparatus is configured to:
detect a pattern in a history of scores of the link quality;
predict a score of future link quality based on the pattern; and
increase a compression rate of data being sent on the wireless link responsive to predicting that the score of future link quality is below a threshold.

18. The apparatus as recited in claim 15, wherein the apparatus is configured to:
increase a compression rate of data being sent on the link if the predicted available bandwidth of the link is below a threshold; and
decrease the compression rate of data being sent on the wireless link if the predicted available bandwidth of the wireless link is above the threshold.

19. The apparatus as recited in claim 15, wherein the translation structure is a table.

20. The apparatus as recited in claim 15, wherein the apparatus is configured to:
predict a decrease in link quality based on the given score; and
increase a compression rate of data being transmitted responsive to predicting the decrease in link quality.

* * * * *